(12) United States Patent
Trachewsky et al.

(10) Patent No.: US 8,400,991 B2
(45) Date of Patent: *Mar. 19, 2013

(54) SIGNALING FORMAT FOR WLANS

(75) Inventors: Jason A. Trachewsky, Menlo Park, CA (US); George Kondylis, Palo Alto, CA (US); Amit G. Bagchi, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,275

(22) Filed: Jun. 29, 2012

(65) Prior Publication Data

US 2012/0269135 A1 Oct. 25, 2012

Related U.S. Application Data

(63) Continuation of application No. 13/153,226, filed on Jun. 3, 2011, now Pat. No. 8,233,465, which is a continuation of application No. 12/785,745, filed on May 24, 2010, now Pat. No. 7,986,679, which is a continuation of application No. 10/973,611, filed on Oct. 26, 2004, now Pat. No. 7,751,429.

(60) Provisional application No. 60/544,605, filed on Feb. 13, 2004, provisional application No. 60/546,622, filed on Feb. 20, 2004, provisional application No. 60/575,921, filed on Jun. 1, 2004.

(51) Int. Cl.
*H04Q 7/24* (2006.01)
(52) U.S. Cl. ........ 370/338; 370/328; 370/466; 370/476; 455/436; 455/443; 455/451; 455/456.1; 455/456.4
(58) Field of Classification Search ....... 455/432.1–433, 455/435.1, 436–442, 456.1–456.3, 457; 370/252, 370/329–333
See application file for complete search history.

(56) References Cited

U.S. PATENT DOCUMENTS

| | | | |
|---|---|---|---|
| 6,697,337 B1 * | 2/2004 | Cafarelli et al. | 370/253 |
| 7,149,213 B1 * | 12/2006 | Rosner et al. | 370/379 |
| 7,339,883 B2 * | 3/2008 | Santhoff et al. | 370/203 |
| 7,577,085 B1 * | 8/2009 | Narasimhan | 370/206 |
| 2004/0246983 A1 * | 12/2004 | Kaatz | 370/432 |
| 2005/0114473 A1 * | 5/2005 | Guy et al. | 709/220 |
| 2005/0136935 A1 * | 6/2005 | Hosur et al. | 455/452.1 |
| 2006/0092885 A1 * | 5/2006 | Brockmann et al. | 370/335 |

* cited by examiner

*Primary Examiner* — Dai A Phuong
(74) *Attorney, Agent, or Firm* — Garlick & Markison; Bruce E. Stuckman

(57) ABSTRACT

A method for wireless communication begins by determining whether legacy devices are within a proximal region of the wireless communication. The method continues, when at least one legacy device is within the proximal region, formatting a frame to include: a legacy preamble; a signal field; an extended preamble; at least one additional signal field; at least one service field; an inter frame gap; and a data field.

24 Claims, 9 Drawing Sheets

SIGNALING FORMAT FOR WLANS

CROSS REFERENCE TO RELATED APPLICATIONS

The present Utility Patent Application claims priority pursuant to 35 U.S.C. §120, as a continuation, of the following U.S. Utility Patent Application which is hereby incorporated herein by reference in its entirety and made part of the present U.S. Utility Patent Application for all purposes:

1. U.S. patent application Ser. No. 13/153,226, entitled "SIGNALING FORMAT FOR WLANS," filed on Jun. 3, 2011, pending, which claims priority under 35 U.S.C. §120 as a continuation of the following U.S. Utility Patent Application which is hereby incorporated herein by reference in its entirety and made part of the present U.S. Utility Patent Application for all purposes:
    A. U.S. patent application Ser. No. 12/785,745, issued as U.S. Pat. No. 7,986,679, entitled "SIGNALING FORMAT FOR WLANS," filed on May 24, 2010, which claims priority under 35 U.S.C. §120 as a continuation of the following U.S. Utility Patent Application which is hereby incorporated herein by reference in its entirety and made part of the present U.S. Utility Patent Application for all purposes:
        i. U.S. patent application Ser. No. 10/973,611, issued as U.S. Pat. No. 7,751,429, entitled "SIGNALING FORMAT FOR WLANS," filed on Oct. 26, 2004 which claims priority to the following U.S. Provisional Patent Applications which are hereby incorporated herein by reference in their entirety and made part of the present U.S. Utility Patent Application for all purposes:
            a. U.S. Provisional Application Ser. No. 60/544,605, entitled "Multiple PROTOCOL WIRELESS COMMUNICATIONS IN A WLAN," filed Feb. 13, 2004.
            b. U.S. Provisional Application Ser. No. 60/546,622, entitled "WIRELESS COMMUNICATION BETWEEN STATIONS OF DIFFERING PROTOCOLS," filed Feb. 20, 2004.
            c. U.S. Provisional Application Ser. No. 60/575,921, entitled "SIGNALING FORMAT FOR WLANS," filed Jun. 1, 2004.

BACKGROUND OF THE INVENTION

1. Technical Field of the Invention

This invention relates generally to wireless communication systems and more particularly to supporting multiple wireless communication protocols within a wireless local area network.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the standard to which a wireless communication device is compliant within a wireless communication system may vary. For instance, as the IEEE 802.11 specification has evolved from IEEE 802.11 to IEEE 802.11b to IEEE 802.11a and to IEEE 802.11g, wireless communication devices that are compliant with IEEE 802.11b may exist in the same wireless local area network (WLAN) as IEEE 802.11g compliant wireless communication devices. As another example, IEEE 802.11a compliant wireless communication devices may reside in the same WLAN as IEEE 802.11g compliant wireless communication devices. When legacy devices (i.e., those compliant with an earlier version of a standard) reside in the same WLAN as devices compliant with later versions of the standard, a mechanism is employed to insure that legacy devices know when the newer version devices are utilizing the wireless channel as to avoid a collision.

For instance, backward compatibility with legacy devices has been enabled exclusively at either the physical (PHY) layer (in the case of IEEE 802.11b) or the Media-Specific Access Control (MAC) layer (in the case of 802.11g). At the PHY layer, backward compatibility is achieved by re-using the PHY preamble from a previous standard. In this instance, legacy devices will decode the preamble portion of all signals, which provides sufficient information for determining that the wireless channel is in use for a specific period of time, thereby avoid collisions even though the legacy devices cannot fully demodulate and/or decode the transmitted frame(s).

At the MAC layer, backward compatibility with legacy devices is enabled by forcing devices that are compliant with a newer version of the standard to transmit special frames using modes or data rates that are employed by legacy devices. For example, the newer devices may transmit Clear to Send/Ready to Send (CTS/RTS) exchange frames and/or CTS to self frames as are employed in IEEE 802.11g. These special frames contain information that sets the NAV (network allocation vector) of legacy devices such that these devices know when the wireless channel is in use by newer stations.

As future standards are developed (e.g., IEEE 802.11n and others), it may be desirable to do more than just avoid collisions between newer version devices and legacy devices. For instance, it may be desirable to allow newer version devices to communication with older version devices.

Therefore, a need exists for a method and apparatus that enables communication between devices of multiple protocols within a wireless communication system, including wireless local area networks.

BRIEF SUMMARY OF THE INVENTION

The signaling format for WLANs of the present invention substantially meets these needs and others. In one embodiment a method for wireless communication begins by determining whether legacy devices are within a proximal region of the wireless communication. The method continues, when at least one legacy device is within the proximal region, formatting a frame to include: a legacy preamble; a signal field; an extended preamble; at least one additional signal field; at least one service field; an inter frame gap; and a data field.

DETAILED DESCRIPTION OF THE INVENTION

Figure 1:
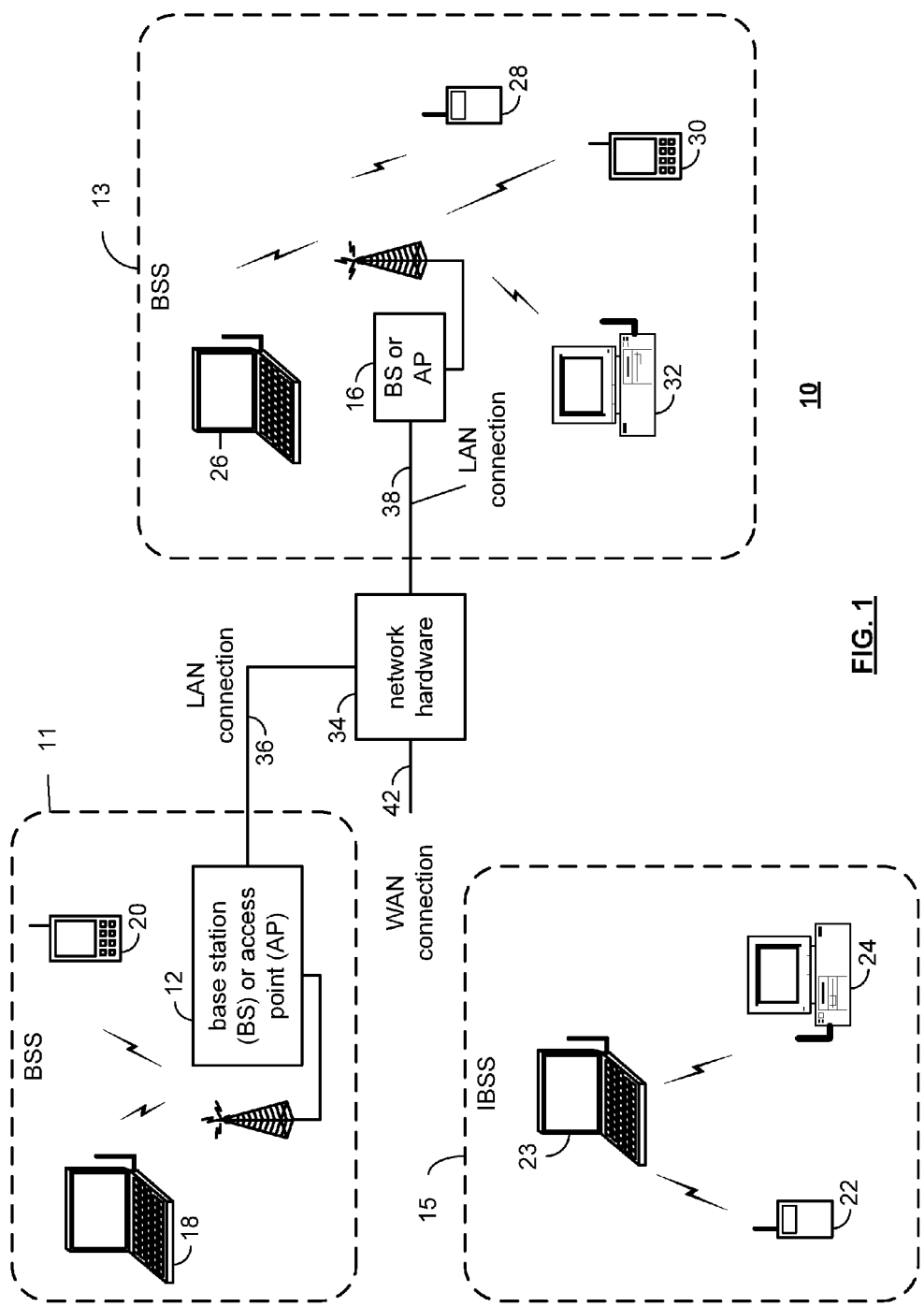
FIG. 1 is a schematic block diagram of a wireless communication system in accordance with the present invention.

FIG. 1 is a schematic block diagram illustrating a communication system 10 that includes a plurality of base stations and/or access points 12 and 16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of at least some of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12 and 16 has an associated antenna or antenna array to communicate with the wireless communication devices in its regional area, which is generally referred to as a basic service set (BSS) 11, 13. Typically, the wireless communication devices register with a particular base station or access point 12 or 16 to receive services from the communication system 10.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Wireless communication devices 22, 23, and 24 are located in an area of the wireless communication system 10 where they are not affiliated with an access point. In this region, which is generally referred to as an independent basic service set (IBSS) 15, the wireless communication devices communicate directly (i.e., point-to-point or point-to-multiple point), via an allocated channel to produce an ad-hoc network.

Figure 2:
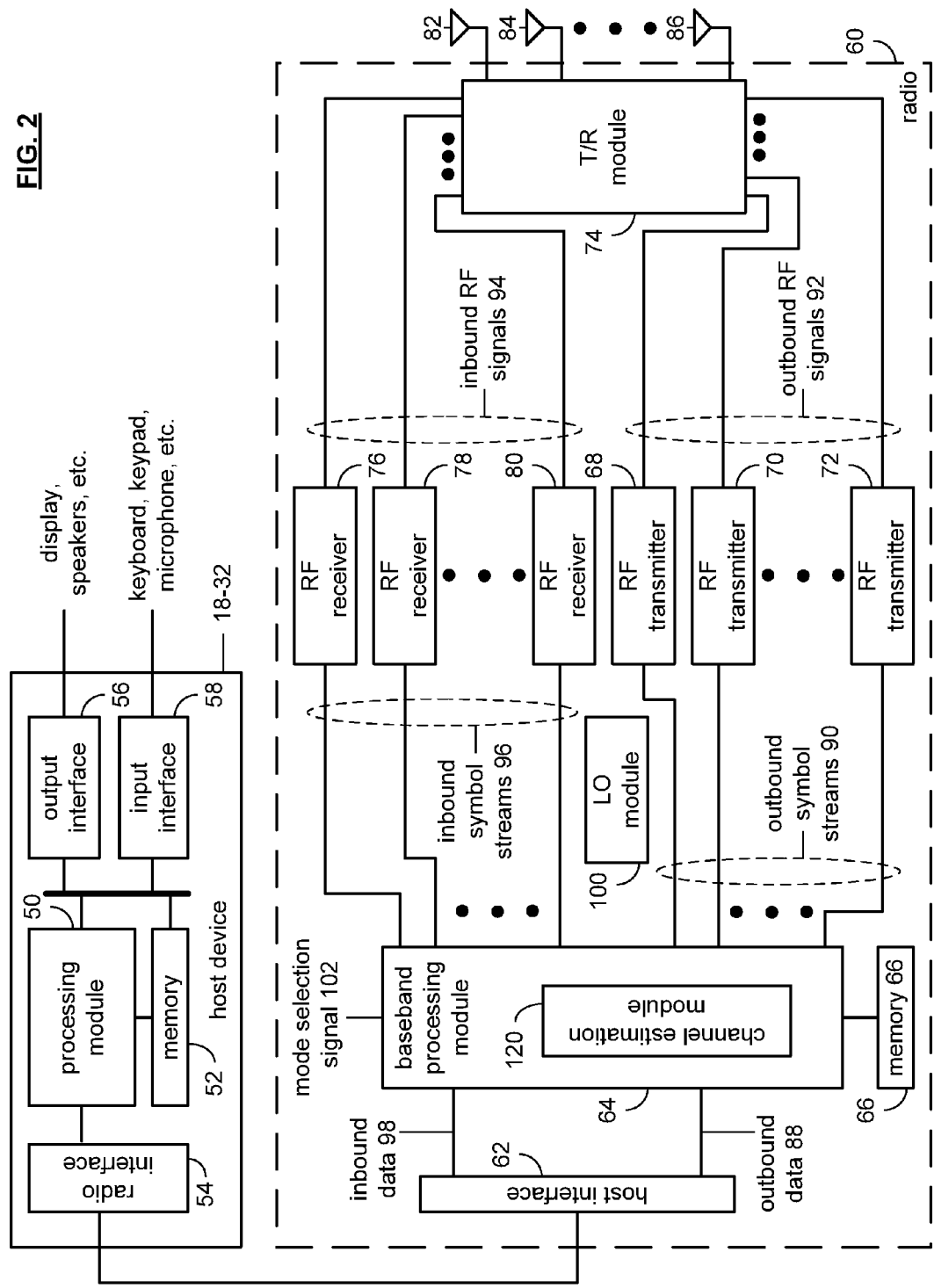
FIG. 2 is a schematic block diagram of a wireless communication device in accordance with the present invention.

FIG. 2 is a schematic block diagram illustrating a wireless communication device that includes the host device 18-32 and an associated radio, or station, 60. For cellular telephone hosts, the radio 60 is a built-in component. For personal digital assistants hosts, laptop hosts, and/or personal computer hosts, the radio 60 may be built-in or an externally coupled component. In this embodiment, the station may be compliant with one of a plurality of wireless local area network (WLAN) protocols including, but not limited to, IEEE 802.11n.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio, or station, 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received. The baseband processing module 60 receives the inbound symbol streams 90 and converts them into inbound data 98, which is provided to the host device 18-32 via the host interface 62. For a further discussion of an implementation of the radio, or station, 60 refer to co-pending patent application entitled WLAN TRANSMITTER HAVING HIGH DATA THROUGHPUT, having a provisional Ser. No. 60/545,854, and a provisional filing date of Feb. 19, 2004 and co-pending patent application entitled WLAN RECEIVER HAVING AN ITERATIVE DECODER, having a provisional Ser. No. 60/546,051 and a provisional filing date of Feb. 19, 2004.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennas 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
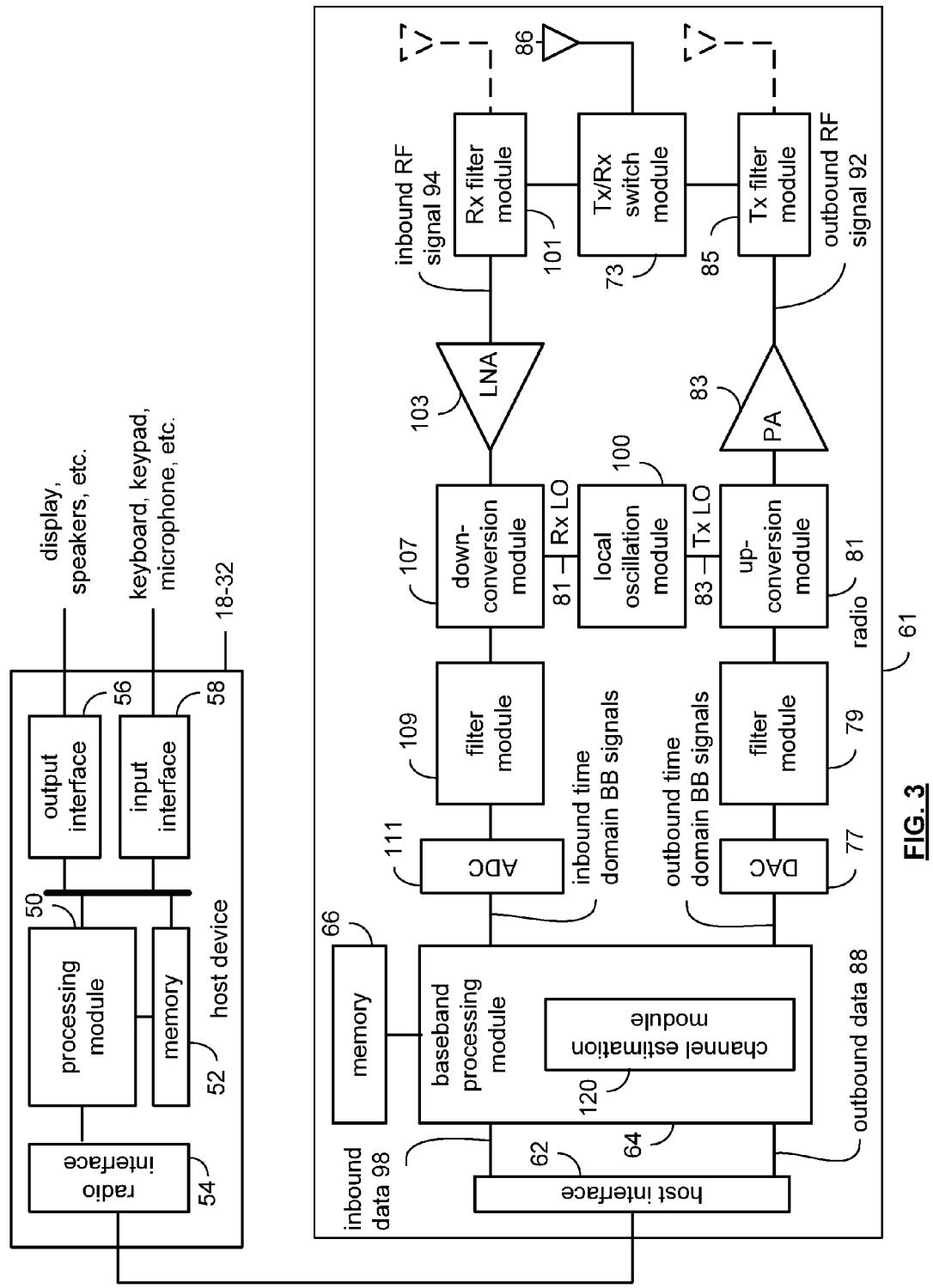
FIG. 3 is a schematic block diagram of another wireless communication device in accordance with the present invention.

FIG. 3 is a schematic block diagram illustrating a wireless communication device that includes the host device 18-32 and an associated radio 61. For cellular telephone hosts, the radio 61 is a built-in component. For personal digital assistants hosts, laptop hosts, and/or personal computer hosts, the radio 61 may be built-in or an externally coupled component. The host device 18-32 operates as discussed above with reference to FIG. 2.

Radio 61 includes a host interface 62, baseband processing module 64, an analog-to-digital converter 111, a filter module 109, an IF mixing down conversion stage 107, a receiver filter 101, a low noise amplifier 103, a transmitter/receiver switch 73, a local oscillation module 74, memory 66, a digital transmitter processing module 76, a digital-to-analog converter 78, a filter module 79, an IF mixing up conversion stage 81, a power amplifier 83, a transmitter filter module 85, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant. The baseband processing module 64 functions as described above and performs one or more of the functions illustrated in FIGS. 5-11.

In operation, the radio 61 receives outbound data 88 from the host device via the host interface 62. The host interface 62 routes the outbound data 88 to the baseband processing module 64, which processes the outbound data 88 in accordance with a particular wireless communication standard (e.g., IEEE 802.11 Bluetooth, et cetera) to produce outbound time domain baseband (BB) signals.

The digital-to-analog converter 77 converts the outbound time domain baseband signals from the digital domain to the analog domain. The filtering module 79 filters the analog signals prior to providing them to the IF up-conversion module 81. The IF up conversion module 81 converts the analog baseband or low IF signals into RF signals based on a transmitter local oscillation 83 provided by local oscillation module 100. The power amplifier 83 amplifies the RF signals to produce outbound RF signals 92, which are filtered by the transmitter filter module 85. The antenna 86 transmits the outbound RF signals 92 to a targeted device such as a base station, an access point and/or another wireless communication device.

The radio 61 also receives inbound RF signals 94 via the antenna 86, which were transmitted by a base station, an access point, or another wireless communication device. The antenna 86 provides the inbound RF signals 94 to the receiver filter module 101 via the Tx/Rx switch 73. The Rx filter 71 bandpass filters the inbound RF signals 94 and provides the filtered RF signals to the low noise amplifier 103, which amplifies the RF signals 94 to produce amplified inbound RF signals. The low noise amplifier 72 provides the amplified inbound RF signals to the IF down conversion module 107, which directly converts the amplified inbound RF signals into inbound low IF signals or baseband signals based on a receiver local oscillation 81 provided by local oscillation module 100. The down conversion module 70 provides the inbound low IF signal or baseband signal to the filtering/gain module 68. The filtering module 109 filters the inbound low IF signals or the inbound baseband signals to produce filtered inbound signals.

The analog-to-digital converter 111 converts the filtered inbound signals into inbound time domain baseband signals. The baseband processing module 64 decodes, descrambles, demaps, and/or demodulates the inbound time domain baseband signals to recapture inbound data 98 in accordance with the particular wireless communication standard being implemented by radio 61. The host interface 62 provides the recaptured inbound data 92 to the host device 18-32 via the radio interface 54.

As one of average skill in the art will appreciate, the wireless communication device of FIG. 3 may be implemented using one or more integrated circuits. For example, the host device may be implemented on one integrated circuit, the baseband processing module 64 and memory 66 may be implemented on a second integrated circuit, and the remaining components of the radio 61, less the antenna 86, may be implemented on a third integrated circuit. As an alternate example, the radio 61 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

In the communication system of FIG. 1, the communication device may be newer devices as described with references to FIGS. 2 and 3 or may be legacy devices (e.g., compliant with an earlier version or predecessor of IEEE 802.11n standard). For the newer devices, they may configure the channel bandwidth in numerous ways as illustrated in FIGS. 4 and 5.

Figure 4:
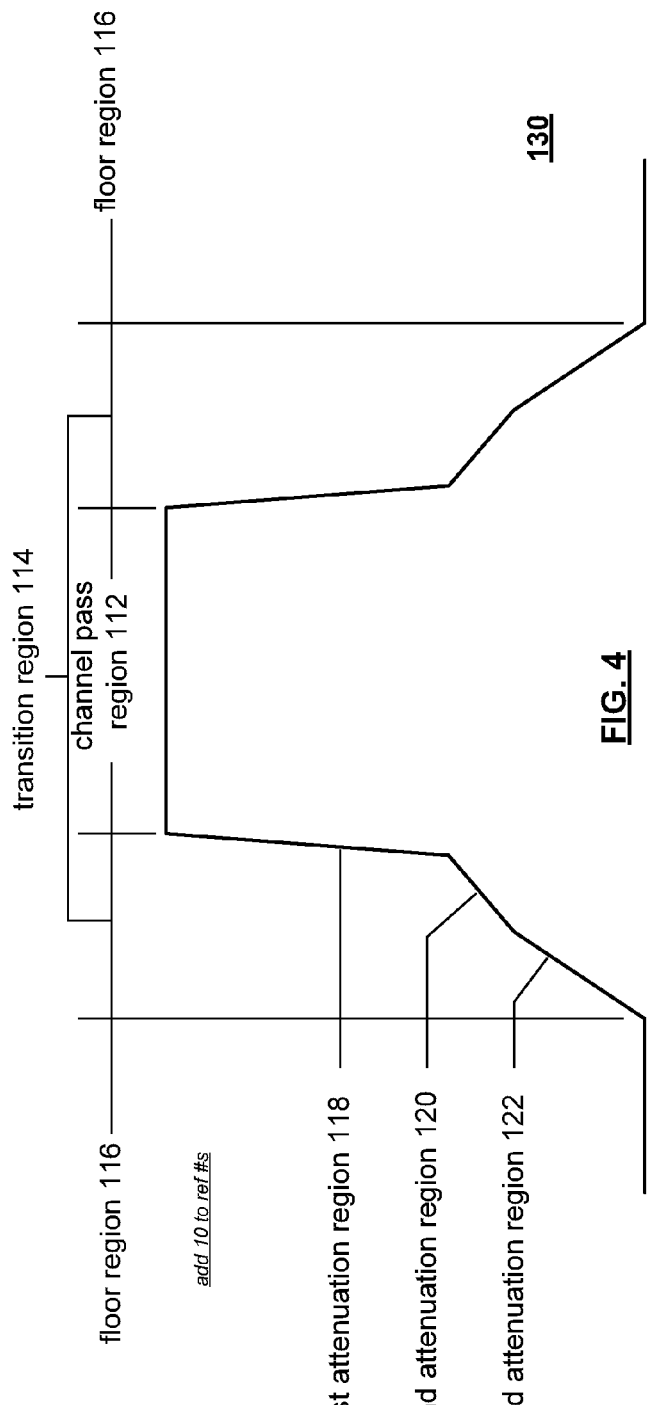
FIG. 4 is a diagram of a configurable spectral mask in accordance with the present invention.
Figure 5:
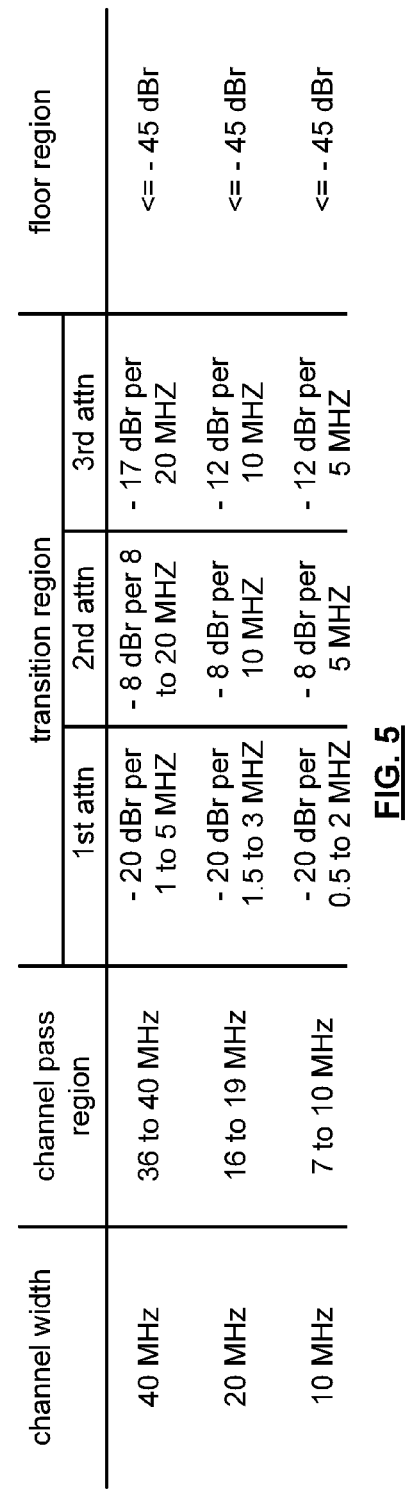
FIG. 5 is a diagram of example spectral masks in accordance with the present invention.

FIG. 4 is a diagram of a configurable spectral mask 130 that includes a channel pass region 112, a transition region 114, and a floor region 116. The transition region 114 includes a first attenuation region 118, a second attenuation region 120, and a third attenuation region 122. Such a spectral mask 130 promotes interoperability, coexistence, and system capacity by limiting interference to adjacent and other channels for a wide variety of applications and/or standards. The out of band mask (e.g., the transition region 114 and the floor region 116) places a lower bound on interference levels that can be expected in receivers regardless of their particular implementation. In an effort to minimize the interference energy that appears on top of the desired signal, the out of band regions are made as small as possible.

To facilitate the above objective, the channel pass region 112, which encompasses the desired signal, is of a value as close to the channel bandwidth as feasible. The transition region 114, which bounds the adjacent channel interference and is limited by the bandwidth of the baseband processing module 64 of FIG. 3 and the intermediate frequency mixing stage of the up-conversion module 81, is selected to minimize such interference (i.e., post IF inter-modulation distortion (IMD)). The floor region 116, which bounds other channel interference, which is outside the range of the filters and IMD limits and is generally limited by the local oscillation 100 phase noise, is selected based on achievable phase noise levels.

For instance, the transition region 114 should have a roll off based on the shoulder height of IMD, which may be assumed to be produced by a $3^{rd}$ order compressive non-linearity. Based on this assumption, the distorted transmit signal y(t) as a function of the ideal transmit signal x(t) can be expressed as: $y(t)=x(t)-f(Ax^3(t))$, where f( ) is a bandpass filter that removes any DC or harmonic signals produced by the non-linearity and $A=4/3(1/OIP_3)^2$, where OIP represents "Output $3^{rd}$ order intercept point", and in the frequency domain $Y(f)=X(f)-AX(F)*X(f)*X(f)$. As such, the distorted signal bandwidth will be no greater than three times the ideal signal bandwidth.

The floor region 116, which is limited by the local oscillator phase noise, may be based on L(f) convolved with the power spectral density of the ideal transmit signal, where L(f) is defined in IEEE std. 1139-1999 as the normalized phase noise spectral density and where $y(t)=x(t)l(t)$ and $Y(f)=X(f)*L(f)$, where x(t) represents the ideal RF signal, l(t) is a model of the phase nose generated in the local oscillator, y(t) represents the resulting signal, and Y(f) is the resulting signal in the frequency domain. Note that at 10 MHz or more from the carrier, phase noise spectrum is relatively flat. From this, a −123 dBc/Hz noise floor may be achieved for 20 MHz channels and a −126 dBc/Hz noise floor may be achieved for 40 MHz channels.

FIG. 5 is a table illustrating a few examples of values for a configurable spectral mask 100. While the table includes channel widths of 10, 20, and 40 MHz, one of average skill in the art will appreciate; other channel widths may be used. Further, the transition region may include more or less attenuation regions than the three shown in FIG. 4.

Figure 6:
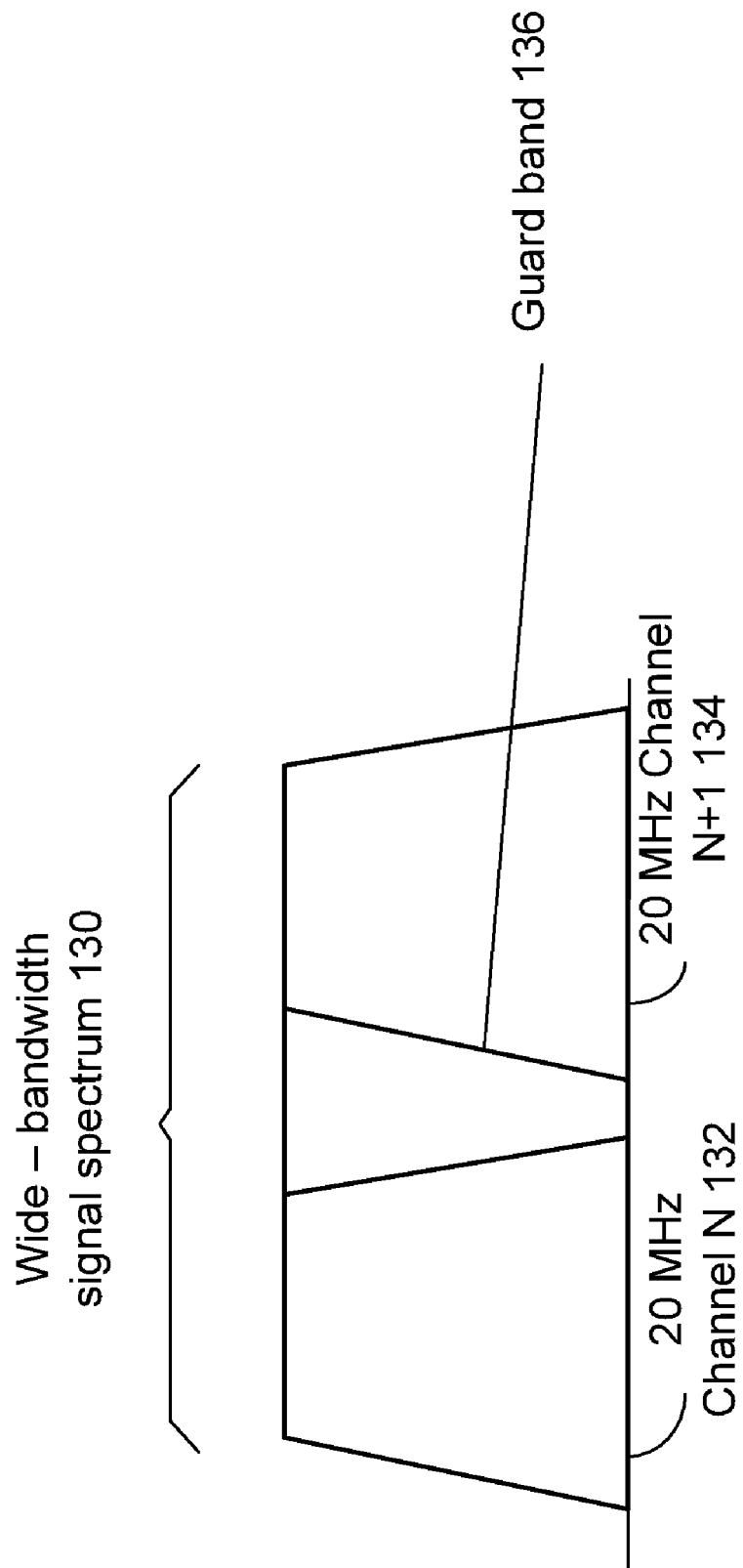
FIG. 6 is a diagram of a wide bandwidth channel with respect to legacy channels in accordance with the present invention.

FIG. 6 is a diagram of a wide bandwidth channel 130 (e.g., 40 MHz) with reference to two legacy channels 132, 134 (e.g., 20 MHz channel N and 20 MHz channel N+1) and a legacy guard interval 136. To construct a wide bandwidth signal 130 without regard as to whether legacy devices are present, the overlapping legacy portions of the two channels 132, 134 are considered when establishing the format for the wide bandwidth channel 130. In one embodiment, the preamble of the wide bandwidth signal 130 includes a legacy header portion (e.g., a preamble in accordance with an earlier version or predecessor of IEEE 802.11n) within the header spectral portion of the first channel 132 (e.g., Channel N) and/or in the second channel 134 (e.g., Channel N+1). As such, legacy devices will be able to recognize the frame and, based on the information contained within the preamble, refrain from transmission until the wide bandwidth signal 130 has been transmitted.

For newer communication devices (i.e., those capable of transceiving the wide bandwidth signals 130), they transmit data and/or header information within the guard band section 136 of legacy channels and in the channels 132, 134. This expands the amount of data that may be transmitted within frame.

In one embodiment, the preamble and packet header of the wide-bandwidth signal 130 uses the same spectrum that the payload of the wide-bandwidth signal 130 will use to provide a legitimate preamble and packet headers that can be transmitted in the portion of the spectrum used by legacy devices. Further, energy of the signal is transmitted in the legacy guard bands 136 so that the receiver may perform reliable preamble processing (carrier detection, gain control, channel estimation, etc.) on the wide-bandwidth signal 130.

In an embodiment, the multiple-channel legacy preambles and packet headers will allow legacy-station reception of the preamble and reliable carrier detection, gain control, and channel estimation over the legacy channels. The guard-band transmission allows for reliable carrier detection, gain control, and channel estimation for the remainder of the spectrum (which will be used for transmission of the wide-bandwidth payload). Further, legacy stations are generally tolerant of adjacent channel transmissions which are at the same power as the desired signal. Still further, legacy stations will see legitimate preambles and packet headers so that they will be able to detect that a signal is present, perform gain control, channel estimation, and other preamble processing, and/or decode the packet header and thereby defer transmission until the end of the wide-band transmission. Yet further, the energy transmitted in the guard band will be disregarded by the receiver and will therefore not hinder the reception of the legacy components of the wide-band signal.

For the newer devices (e.g., IEEE 802.11n compliant), the devices will have more energy for carrier detection, be able to perform a better estimate of received power, thereby being able to do better gain control on the packet, be able to estimate the channel response in the guard band (for use during payload demodulation), and have full access to the medium since legacy stations can see the transmission and defer until its end.

Figure 7:
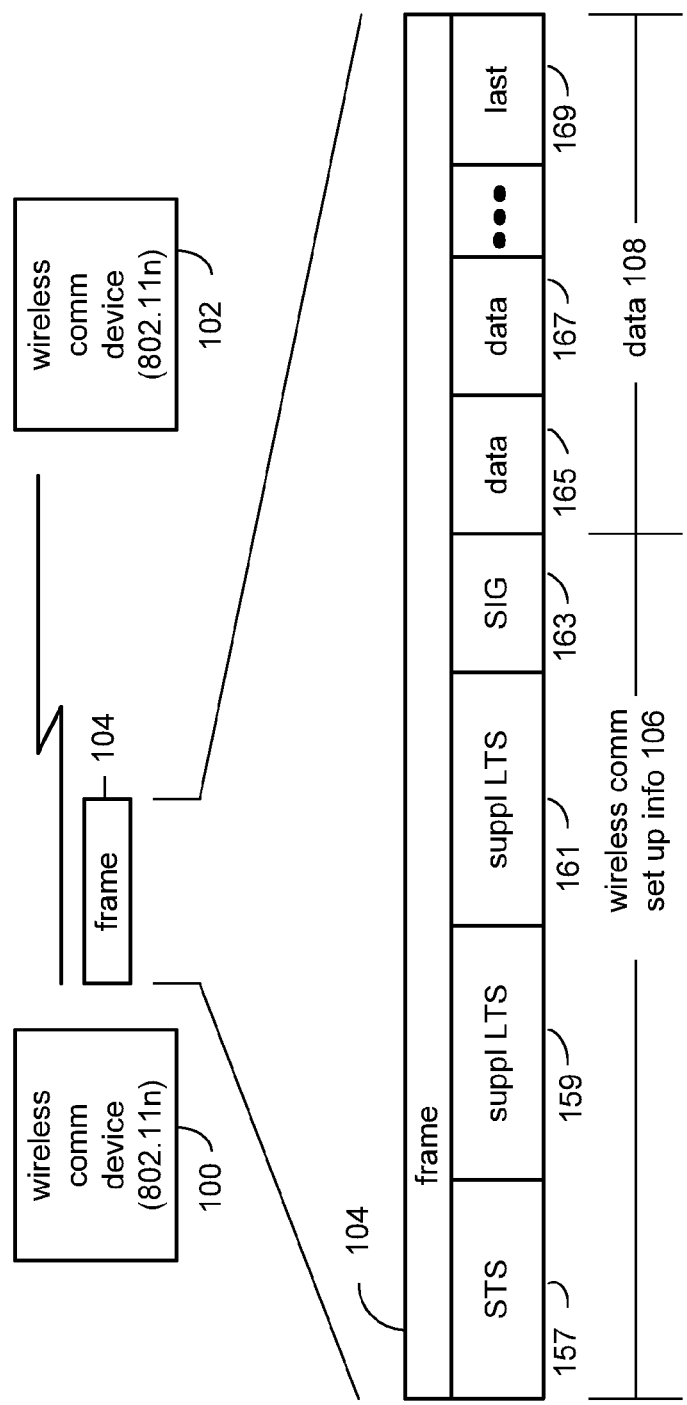
FIG. 7 is a schematic block diagram of a wide bandwidth communication in accordance with the present invention.

FIG. 7 is a diagram depicting a wireless communication between two wireless communication devices 100 and 102 that are in a proximal region where the only protocol that is used is IEEE 802.11n. The wireless communication may be direct (i.e., from wireless communication device to wireless communication device), or indirect (i.e., from a wireless communication device to an access point to a wireless communication device). In this example, wireless communication device 100 is providing frame 104 to wireless communication device 102. The frame 104 includes a wireless communication set-up information field 106 and a data portion 108. The wireless communication set-up information portion 106 includes a short training sequence 157 that may be 8 microseconds long, a 1$^{st}$ supplemental long training sequence 159 that may be 4 microseconds long, which is one of a plurality of supplemental long training sequences 161, and a signal field 163 that may be 4 microseconds long. Note that the number of supplemental long training sequences 159, 161 will correspond to the number of transmit antennas being utilized for multiple input multiple output radio communications.

The data portion of the frame 104 includes a plurality of data symbols 165, 167, 169 each being 4 microseconds in duration. The last data symbol 169 also includes a tail bits and padding bits as needed.

Figure 8:
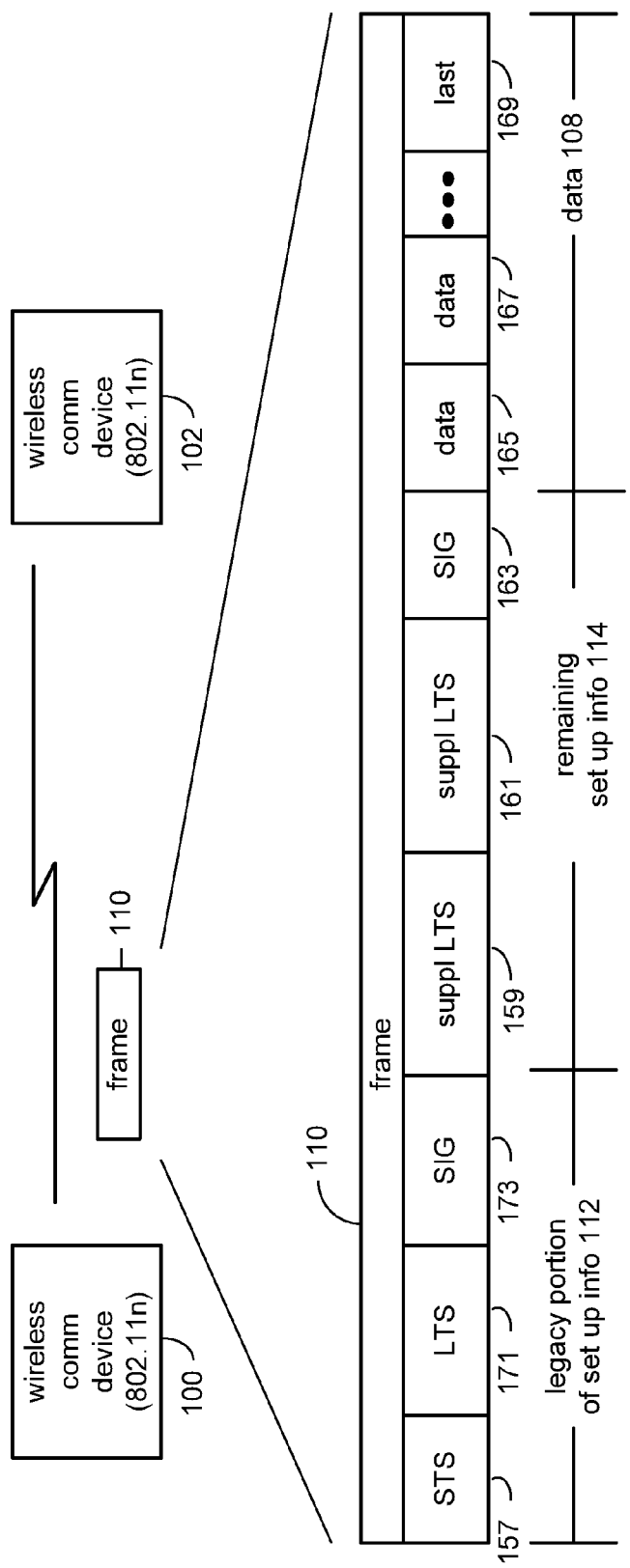
FIG. 8 is a schematic block diagram of another wide bandwidth communication in accordance with the present invention.

FIG. 8 is a diagram of a wireless communication between two wireless communication devices 100 and 102, each of which is compliant with IEEE 802.11n. Such a communication is taking place within a proximal area that includes 802.11n compliant devices, 802.11a compliant devices and/or 802.11g compliant devices. In this instance, the wireless communication may be direct or indirect where a frame 110 includes a legacy portion of the set-up information 112, remaining set-up information portion 114, and the data portion 108.

The legacy portion of the set-up information 112 includes a short training sequence 157, which is 8 microseconds in duration, a long training sequence 171, which is 8 microseconds in duration, and a signal field 173, which is 4 microseconds in duration. The signal field 173, as is known, includes several bits to indicate the duration of the frame 110. As such, the IEEE 802.11a compliant devices within the proximal area and the 802.11g compliant devices within the proximal area will recognize that a frame is being transmitted even though such devices will not be able to interpret the remaining portion of the frame. In this instance, the legacy devices (IEEE 802.11a and IEEE 802.11g) will avoid a collision with the IEEE 802.11n communication based on a proper interpretation of the legacy portion of the set-up information 112.

The remaining set-up information 114 includes additional supplemental long $$S_k = \begin{bmatrix} s_{10,k} & s_{11,k} & s_{12,k} \\ s_{20,k} & s_{21,k} & s_{22,k} \\ s_{30,k} & s_{31,k} & s_{32,k} \end{bmatrix} = \begin{bmatrix} s_{00,k} & s_{00,k} \cdot e^{i\cdot\theta_k} & s_{00,k} \cdot e^{i\cdot\phi_k} \\ s_{00,k} & s_{00,k} \cdot e^{i\cdot(\theta_k - \frac{4\pi}{3})} & s_{00,k} \cdot e^{i\cdot(\phi_k - \frac{2\pi}{3})} \\ s_{00,k} & s_{00,k} \cdot e^{i\cdot(\theta_k - \frac{2\pi}{3})} & s_{00,k} \cdot e^{i\cdot(\phi_k - \frac{4\pi}{3})} \end{bmatrix}$$

training sequences 159, 161, which are each 4 microseconds in duration. The remaining set-up information further includes a high data signal field 163, which is 4 microseconds in duration to provide additional information regarding the frame. The data portion 108 includes the data symbols 165, 167, 169, which are 4 microseconds in duration as $$\theta_k = \pi \cdot k/(4 \cdot N_{subcarriers})$$

$$\phi_k = \pi \cdot (k+4)/(2 \cdot N_{subcarriers})$$

previously described with reference to FIG. 7. In this instance, the legacy protection is provided at the physical layer.

Figure 9:
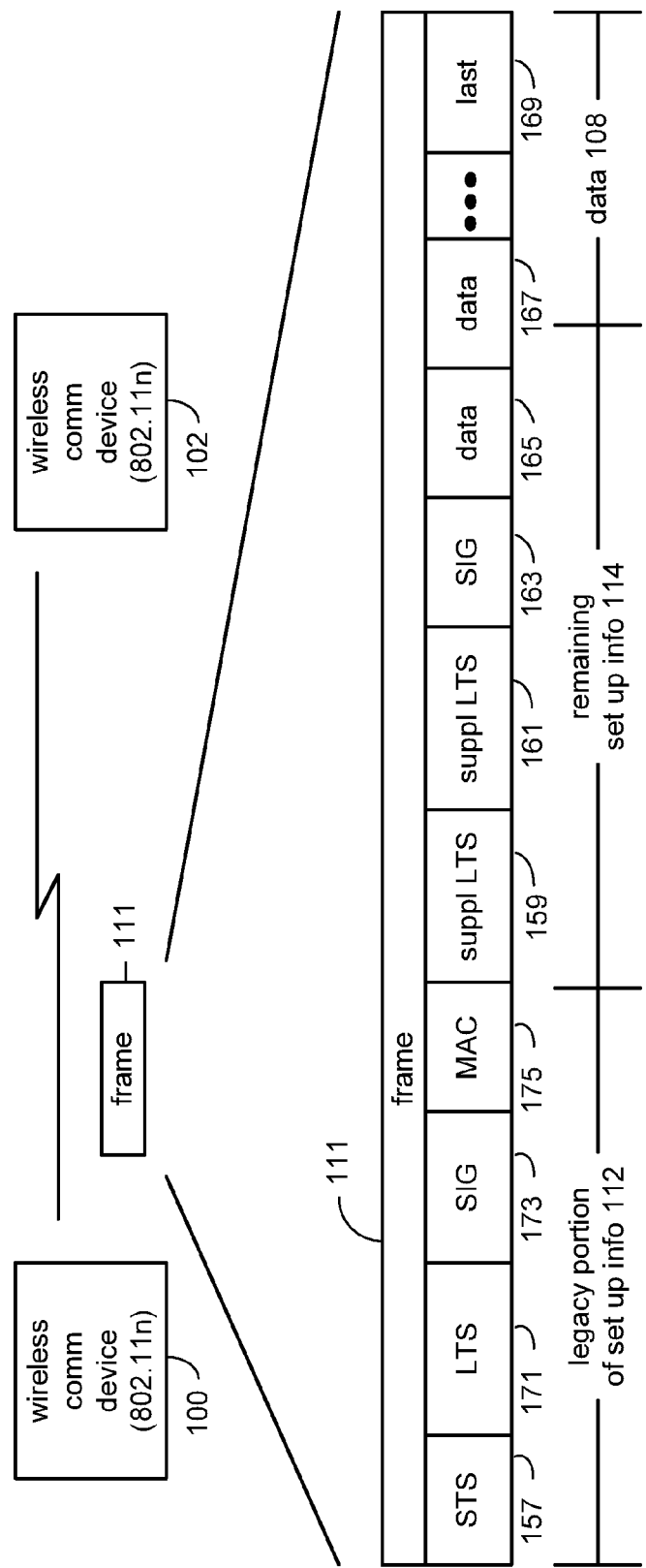
FIG. 9 is a schematic block diagram of yet another wide bandwidth communication in accordance with the present invention.

FIG. 9 is a diagram of a wireless communication between two wireless communication devices 100 and 102 that are both IEEE 802.11n compliant. The wireless communication may be direct or indirect within a proximal area that includes IEEE 802.11 compliant devices, IEEE 802.11a, 802.11b and/or 802.11g devices. In this instance, the frame 111 includes a legacy portion of the set-up information 112, remaining set-up information 114 and the data portion 108. As shown, the legacy portion of the set-up information 112, or legacy frame, includes an IEEE 802.11 PHY preamble (i.e., STS 157, LTS 171, and signal field 173) and a MAC partitioning frame portion 175, which indicates the particulars of this particular frame that may be interpreted by legacy devices. In this instance, the legacy protection is provided at the MAC layer.

The remaining set-up information 114 includes a plurality of supplemental long training sequences 159, 161 and the high data signal field 163. The data portion 108 includes a plurality of data symbols 165, 167, 169 as previously described.

Figure 10:
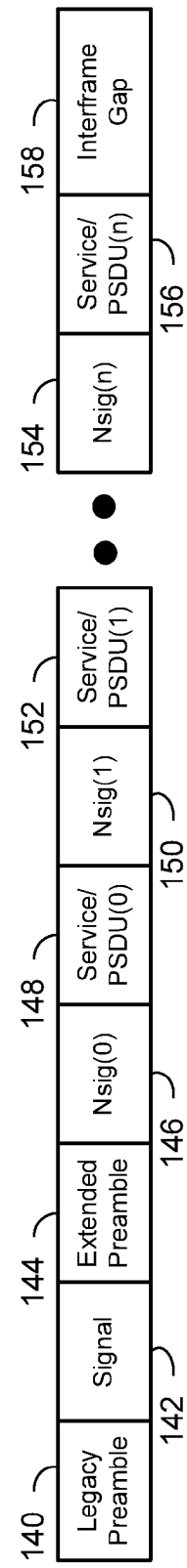
FIG. 10 is a diagram of a backward compatible signaling format in accordance with the present invention.

FIG. 10 is a diagram of a backward compatible signaling format. The signaling format includes a legacy preamble 140, a signal field 142, an extended preamble 144, a plurality of additional signal fields 146, 150, 154, a plurality of data units (Service/PSDU) 148, 152, 156, and an interframe gap 158. In general, the frame format is as previously described with reference to FIGS. 8 and 9, where the initial signal field 142 is used to inform the legacy devices of the duration of the frame so that the legacy devices do not attempt to access the channel while it is in use by newer devices. The signal field 142 is further used to inform the newer devices (e.g., the IEEE 802.11n compliant devices) of the channel usage for 802.11n transmission and the number of transmit antennas for the transmission.

The additional signal fields 146, 150, 154 indicate the rate/mode, the length (in bytes) of the frame, the last PSDU in the frame (or burst), whether a PSDU immediate ACK is required, and error checking capabilities. The rate/mode portion may be six bits in length to: implicitly convey number of transmit antennas, (legacy signal field will be absent in homogeneous 802.11n case); implicitly convey channel width (802.11n signal field transmitted by either 20 MHz or 40 MHz channel devices should be receivable by either 20 MHz or 40 MHz channel devices); assume PHY data rates spanning 6 mbps through 448 mbps, with roughly 33% throughput increase with each higher data rate, 16 rates are required, or 4 bits; and/or allow 4 modes for achieving any given rate (varying channel width, subcarrier constellation size, number of transmit antennas, etc.), or 2 bits.

The length portion of the signal field(s) may be 12 bits to: allow PSDUs up to 4095 bytes long as in legacy case; MAC level extension for PSDU bursting need not be represented in Length (e.g.: as a Burst ID or Burst Length) since Burst length may actually be unknown at start of burst or, even if burst length is known, need only be conveyed once at start or end of burst, no need to index PSDUs in a Burst at PHY level, (MAC methods exist for unique PSDU identification).

The last PSDU portion of the signal field(s) 146, 150, 154 may be 1 bit to, as explained above, convey burst length once at end of burst, with a bit denoting "Last PSDU". The immediate ACK portion of the signal field(s) may be 1 bit to resolve contention between responding devices when a series of immediate MAC acknowledgements are required to the series of PSDUs in a transmitted burst.

In another embodiment, 26-30 bits may be used per signal field(s) 146, 150, 154 to convey the rate/mode (6 bits), length (12 bits), last PSDU (1 bit), immediate ACK (1 bit), CRC (4 bits), with 2-6 bits reserved. The CRC section offers error detection.

Further, legacy coding and modulation use rate 1/2 convolutional code and BPSK in 48 data bearing subcarriers, which allow 24 uncoded bits per signal field, of which 18 information bits are available, the remaining 6 bits providing tail bits for immediate decoding. For .11n communications, the signal field uses 26-30 information bits per signal field, yet remain at least as robust in performance (comparable Signal-to-Noise Ratio required to achieve a given Probability of Signal Field Error), and offer superior error detection capability.

Modulation for the frame may include QPSK in 48 data bearing subcarriers, allowing 96 coded bits per signal field 146, 150, 154 and, for 40 MHz channels, may include replicate 48 subcarrier usage in upper and lower 20 MHz halves to allow .11n signal field demodulation by 20 MHz channel .11n devices.

The coding may include several options. The first option assumes 6 Reserved info bits and employs legacy constraint length 6, rate 1/2 convolutional code, G=[133, 171], inserting 18 "tail" bits, (12 in addition to 6 legacy tail bits) to allow perfect knowledge of encoder state at 3 points in transmitted sequence. Further, uncoded bits and "tail" are arranged as follows:
[10 info, 6 tail, 10 info, 6 tail, 10 info, 6 tail]=30 info bits+18 tail bits=48 uncoded bits, or 96 coded bits per signal field.

The second option 2 assumes 4 Reserved info bits and employs an outer (6,4) RS block code over GF(27), followed by an inner legacy constraint length 6, rate 1/2, convolutional code, G=[133, 171], appending 6 tail bits. The 28 info bits are grouped into 4 GF(27) elements, 14 parity bits or 2 GF(27) elements are added by RS encoding, resulting in 42 block coded bits or 1 RS block; tail bit addition results in 48 un-convolutionally-coded bits, or 96 concatenated coded bits per signal field.

The third option assumes 2 Reserved info bits and employs a constraint length 6, rate 1/3 convolutional code, G=[117, 127, 155], appending 6 tail bits. The 26 info bits+6 tail bits=32 uncoded bits, or 96 coded bits per signal field.

Figure 11:
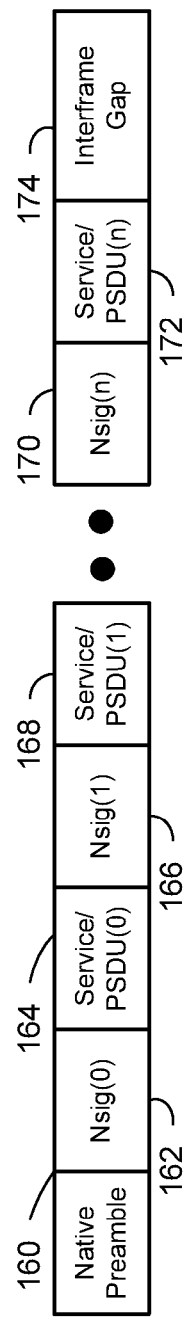
FIG. 11 is a native signaling format in accordance with the present invention.

FIG. 11 is a diagram of the frame where only newer devices (e.g., 802.11n compliant devices) are present in a proximal area of the wireless local area network. In this instance, the signaling format includes a native preamble 160, a plurality of additional signal fields 162, 166, 170, a plurality of data units (Service/PSDU) 164, 168, 172, and an interframe gap 174. The signal fields 162, 166, 170 convey the same information as the signal fields 142, 146, 150, 154 with reference to FIG. 10.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented various embodiments for wireless communications in a network that includes legacy devices. As one of average skill in the art will appreciate, other embodiments may be derived from the teachings of the present invention without deviating from the scope of the claims.

What is claimed is:

1. A method for wireless communication in a network that includes non-legacy devices, the method comprises:
   determining whether a legacy device is within a proximal region of the wireless communication;
   when the legacy device is not within the proximal region, format a frame to include:
      a native preamble;
      at least one signal field;
      at least one service field;
      an inter frame gap; and
      a data field;
   wherein the at least one signal field comprises at least one of:
      rate/mode information;
      length information;
      last data unit in the frame indication;
      data unit acknowledgment requirement; and
      error checking capability;
   when the legacy device is within the proximal region, formatting a frame to include:
      a first portion having a legacy preamble that is readable by the legacy device in accordance with a legacy frame format;
      a second portion having an extended preamble that is unreadable by the legacy device in accordance with the legacy frame format and is readable by the non-legacy devices in accordance with a non-legacy frame format;
      a third portion that includes at least one of:
         at least one service field;
         an inter frame gap; and
         a data field.

2. The method of claim 1, wherein the rate/mode information comprises at least one of;
   implicit number of transmit antennas;
   implicit channel width; and
   physical layer data rate.

3. The method of claim 1, wherein the length information comprises bytes of PSDU [PLCP (physical layer convergence procedure) Service Data Unit].

4. The method of claim 1 further comprises at least one of:
   coding the at least one signal field using a rate 1/2 convolutional code;
   coding the at least one signal field using an outer Reed-Solomon block code and an inner coding of the rate 1/2 convolutional code; and
   coding the at least one signal field using a rate 1/3 convolutional code with a constraint length of six.

5. The method of claim 1 further comprises at least one of:
   for a legacy channel, utilizing a quadrature phase shift keying (QPSK) for the at least one signal field; and
   for a wide bandwidth channel:
   utilizing QPSK for subcarriers of a first portion of the wide bandwidth channel, wherein the first portion has a bandwidth corresponding to the legacy channel; and
   replicating the first portion for a second portion of the wide bandwidth channel.

6. The method of claim 1, wherein the at least one signal field includes a number of antennas.

7. A radio frequency (RF) transmitter for use in communicating with legacy devices that operate in accordance with a first frame format and non-legacy devices that communicate in accordance with a second frame format, the RF transmitter comprises:
   a baseband processing module operably coupled to convert outbound data into an outbound symbol stream; and
   a transmitter section operably coupled to convert the outbound symbol stream into outbound RF signals, wherein the baseband processing module is operably coupled to:
      determine whether at least one of the legacy devices is within a proximal region of the wireless communication;
      when the at least one of the legacy devices is not within the proximal region, format a frame in the second frame format to include:
         a native preamble;
         at least one signal field;
         at least one service field;
         an inter frame gap; and a data field;
      wherein the at least one signal field comprises at least one of:
         rate/mode information;
         length information;
         last data unit in the frame indication;
         data unit acknowledgment requirement; and
         error checking capability;
      when the at least one of the legacy devices is within the proximal region, formatting a frame to include:
         a first portion having a legacy preamble that is readable by the legacy device in accordance with a legacy frame format;
         a second portion having an extended preamble that is unreadable by the legacy device in accordance with the legacy frame format and is readable by the non-legacy devices in accordance with a non-legacy frame format;
         a third portion that includes at least one of:
            at least one service field;
            an inter frame gap; and
            a data field.

8. The RF transmitter of claim 7, wherein the rate/mode information comprises at least one of:
   implicit number of transmit antennas;
   implicit channel width; and
   physical layer data rate.

9. The RF transmitter of claim 7, wherein the length information comprises at least one of:
   bytes of PSDU [PLCP (physical layer convergence procedure) Service Data Unit].

10. The RF transmitter of claim 7, wherein the baseband processing module is further operably coupled to, at least one of:
   code the at least one signal field using a rate 1/2 convolutional code;
   code the at least one signal field using an outer Reed-Solomon block code and an inner coding of the rate 1/2 convolutional code; and
   code the at least one signal field using a rate 1/3 convolutional code with a constraint length of six.

11. The RF transmitter of claim 7, wherein the baseband processing module is further operably coupled to, at least one of:
   for a legacy channel, utilize a quadrature phase shift keying (QPSK) for the at least one signal field; and
   for a wide bandwidth channel:
      utilize QPSK for subcarriers of a first portion of the wide bandwidth channel, wherein the first portion has a bandwidth corresponding to the legacy channel; and
      replicate the first portion for a second portion of the wide bandwidth channel.

12. The RF transmitter of claim 7, wherein the signal field includes a number of antennas.

13. A radio frequency (RF) transmitter for use in communicating with legacy devices that operate in accordance with a first frame format and non-legacy devices that communicate in accordance with a second frame format, the RF transmitter comprises:
   a baseband processing module operably coupled to convert outbound data into an outbound symbol stream; and
   a transmitter section operably coupled to convert the outbound symbol stream into outbound RF signals, wherein the baseband processing module is operably coupled to:
      determine whether at least one of the legacy devices is within a proximal region of the wireless communication;
      when the at least one of the legacy devices is not within the proximal region, format a frame in the second frame format to include:
         a native preamble;
         at least one signal field;
         at least one service field;
         an inter frame gap; and a data field;
         wherein the at least one signal field comprises at least one of:
            rate/mode information;
            length information;
            last data unit in the frame indication;
            data unit acknowledgment requirement; and
            error checking capability;
      when the at least one of the legacy devices is within the proximal region, formatting a frame to include:
         a first portion having a legacy preamble that is readable by the legacy device in accordance with a legacy frame format;
         a second portion having an extended preamble that is unreadable by the legacy device in accordance with the legacy frame format and is readable by the non-legacy devices in accordance with a non-legacy frame format;
         a third portion that includes at least one of:
            at least one service field;
            an inter frame gap; and
            a data field;
         wherein the first frame format and the second frame format are each compliant with corresponding wireless local area network communication protocols.

14. The RF transmitter of claim 13, wherein the rate/mode information comprises at least one of:
   implicit number of transmit antennas;
   implicit channel width; and
   physical layer data rate.

15. The RF transmitter of claim 13, wherein the length information comprises at least one of:
   bytes of PSDU [PLCP (physical layer convergence procedure) Service Data Unit].

16. The RF transmitter of claim 13, wherein the baseband processing module is further operably coupled to, at least one of:
   code the at least one signal field using a rate 1/2 convolutional code;
   code the at least one signal field using an outer Reed-Solomon block code and an inner coding of the rate 1/2 convolutional code; and
   code the at least one signal field using a rate 1/3 convolutional code with a constraint length of six.

17. The RF transmitter of claim 13, wherein the baseband processing module is further operably coupled to, at least one of:
   for a legacy channel, utilize a quadrature phase shift keying (QPSK) for the at least one signal field; and
   for a wide bandwidth channel:
      utilize QPSK for subcarriers of a first portion of the wide bandwidth channel, wherein the first portion has a bandwidth corresponding to the legacy channel; and
      replicate the first portion for a second portion of the wide bandwidth channel.

18. The RF transmitter of claim 13, wherein the signal field includes a number of antennas.

19. A radio frequency (RF) transmitter for use in communicating with legacy devices that operate in accordance with a first frame format and non-legacy devices that communicate in accordance with a second frame format, the RF transmitter comprises:
   a transmitter section operably coupled to convert an outbound symbol stream into outbound RF signals, wherein the baseband processing module is operably coupled to:
      determine whether at least one of the legacy devices is within a proximal region of the wireless communication;
      when the at least one of the legacy devices is not within the proximal region, format a frame in the second frame format to include:
         a native preamble;
         at least one signal field;
         at least one service field;
         an inter frame gap; and a data field;
         wherein the at least one signal field comprises at least one of:
            rate/mode information;
            length information;
            last data unit in the frame indication;
            data unit acknowledgment requirement; and
            error checking capability;
      when the at least one of the legacy devices is within the proximal region, formatting a frame to include:
         a first portion having a legacy preamble that is readable by the legacy device in accordance with a legacy frame format;
         a second portion having an extended preamble that is unreadable by the legacy device in accordance with the legacy frame format and is readable by the non-legacy devices in accordance with a non-legacy frame format;

a third portion that includes at least one of:
at least one service field;
an inter frame gap; and
a data field.

20. The RF transmitter of claim 19, wherein the rate/mode information comprises at least one of:
implicit number of transmit antennas;
implicit channel width; and
physical layer data rate.

21. The RF transmitter of claim 19, wherein the length information comprises at least one of:
bytes of PSDU [PLCP (physical layer convergence procedure) Service Data Unit].

22. The RF transmitter of claim 19, wherein the baseband processing module is further operably coupled to, at least one of:
code the at least one signal field using a rate 1/2 convolutional code;
code the at least one signal field using an outer Reed-Solomon block code and an inner coding of the rate 1/2 convolutional code; and
code the at least one signal field using a rate 1/3 convolutional code with a constraint length of six.

23. The RF transmitter of claim 19, wherein the baseband processing module is further operably coupled to, at least one of:
for a legacy channel, utilize a quadrature phase shift keying (QPSK) for the at least one signal field; and
for a wide bandwidth channel:
utilize QPSK for subcarriers of a first portion of the wide bandwidth channel, wherein the first portion has a bandwidth corresponding to the legacy channel; and
replicate the first portion for a second portion of the wide bandwidth channel.

24. The RF transmitter of claim 19, wherein the signal field includes a number of antennas.

* * * * *